(12) United States Patent
Tang (10) Patent No.: US 11,089,578 B2
(45) Date of Patent: Aug. 10, 2021

(54) RLC LAYER STATUS REPORT CONTROL PDU TRANSMITTING METHOD AND RELATED DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/476,066

(22) PCT Filed: Jan. 4, 2017

(86) PCT No.: PCT/CN2017/070185
§ 371 (c)(1),
(2) Date: Jul. 3, 2019

(87) PCT Pub. No.: WO2018/126362
PCT Pub. Date: Jul. 12, 2018

(65) Prior Publication Data
US 2019/0357202 A1 Nov. 21, 2019

(51) Int. Cl.
*H04W 72/04* (2009.01)
*H04L 12/801* (2013.01)
*H04W 72/02* (2009.01)

(52) U.S. Cl.
CPC ......... *H04W 72/0413* (2013.01); *H04L 47/34* (2013.01); *H04W 72/02* (2013.01)

(58) Field of Classification Search
CPC ..... H04L 1/1621; H04L 1/1635; H04L 1/165; H04L 1/1809; H04L 47/34; H04W 72/02; H04W 72/0413
See application file for complete search history.

(56) References Cited

U.S. PATENT DOCUMENTS

| 2013/0044698 | A1* | 2/2013 | Susitaival | H04W 28/06 370/329 |
|---|---|---|---|---|
| 2013/0163510 | A1 | 6/2013 | Chakravarthy et al. | |
| 2016/0127939 | A1 | 5/2016 | Bathwal et al. | |

(Continued)

FOREIGN PATENT DOCUMENTS

| CN | 1708169 A | 12/2005 |
|---|---|---|
| CN | 1968524 A | 5/2007 |

(Continued)

OTHER PUBLICATIONS

European Search Report dated Dec. 4, 2019 from Application No. 17890692.1.

(Continued)

*Primary Examiner* — Saad A. Waqas (57) ABSTRACT

A method for transmitting an RLC layer status report control PDU is provided, which includes: receiving, by a user equipment, configuration information sent by a network device, wherein the configuration information includes at least one control PDU format; selecting, by the user equipment, a control PDU format from the at least one control PDU format to generate a status report control PDU, and reporting the status report control PDU. A related device is also provided.

8 Claims, 7 Drawing Sheets

(56) References Cited

U.S. PATENT DOCUMENTS

| | | | |
|---|---|---|---|
| 2016/0150433 A1 | 5/2016 | Bergquist et al. | |
| 2018/0213439 A1* | 7/2018 | Uchino | H04L 1/165 |
| 2019/0230667 A1* | 7/2019 | Loehr | H04W 8/02 |

FOREIGN PATENT DOCUMENTS

| | | |
|---|---|---|
| CN | 101369879 A | 2/2009 |
| CN | 101391516 A | 3/2009 |
| CN | 101478380 A | 7/2009 |
| CN | 101663850 A | 3/2010 |
| CN | 101827016 A | 9/2010 |
| CN | 101877882 A | 11/2010 |
| CN | 101931516 A | 12/2010 |
| CN | 104518852 A | 4/2015 |
| CN | 103260189 B | 8/2016 |
| EP | 2586150 A1 | 5/2013 |
| JP | 2010518683 A | 5/2010 |
| KR | 20040073884 A | 8/2004 |
| RU | 2009132954 A | 3/2011 |
| RU | 2457636 C2 | 7/2012 |
| RU | 2012131058 A | 1/2014 |
| WO | 2012006120 A1 | 1/2012 |
| WO | 2016069139 A1 | 5/2016 |

OTHER PUBLICATIONS

English translation of CN OA for CN 201780082381.4 dated Mar. 10, 2020.
English translation of CL OA for CL 201901829 dated Mar. 19, 2020.
3GPP TSG RAN WG2 meeting #14; Paris, France, Jul. 3-7, 2000; R2-001526.
3GPP TSG-RAN2 Meeting #60; Tdoc; Jeju, Korea, Nov. 5-9, 2007; R2-075014.
English translation of China Office Action for CN Application 201780082381.4 dated Jun. 8, 2020.
English translation of Russia Decision on Grant for RU Application 2019124041/07(046980) dated May 28, 2020.
Singapore Written Opinion for Application 11201906180X dated Jul. 23, 2020.
R2-169092; No RLC Concatenation in NR; 16 pages.
R2-169092; No RLC Concatenation in NR; pp. 1-16.
Recommendation for grant for Chile Application No. 201901829 dated Sep. 4, 2020; pp. 1-10.
European Examination Report for EP Application 17890692.1 dated Apr. 1, 2021. (4 pages).
Japanese Office Action with English Translation for JP Application 2019-536262 dated Feb. 2, 2021. (6 pages).
Indian Examination Report for IN Application 201917028297 dated Jun. 10, 2021. (5 pages).

* cited by examiner

| D/C | CPT | ACK_SN |
|---|---|---|
| ACK_SN | | |
| ACK_SN | E1 | NACK_SN_High |
| NACK_SN_High | | |
| NACK_SN_High | E1 | E2 | NACK_SN_Low |
| NACK_SN_Low | | | |
| NACK_SN_Low | ... | | | |

| D/C | CPT | ACK_SN |
|---|---|---|

ACK_SN

| ACK_SN | E1 | NACK_SN_High1 |

NACK_SN_High1

| NACK_SN_High1 | E1 | E2 | NACK_SN_Low1 |

NACK_SN_Low1

| NACK_SN_Low1 | E1 | E2 | NACK_SN_High2 |

NACK_SN_High2

| NACK_SN_High2 | E1 | E2 |

NACK_SN_Low2

| NACK_SN_Low2 | ... |

FIG. 6

| D/C | CPT | ACK_SN | |
|---|---|---|---|
| ACK_SN | | | |
| ACK_SN | E1 | NACK_SN | |
| NACK_SN | | | |
| NACK_SN | | E1 | E2 |
| NACK_SN | | | |
| NACK_SN | | | E1 |
| E2 | SOstart | | |
| SOstart | | | |
| SOend | | | |
| SOend | | | |
| NACK_SN | | | |
| ... | | | |

RLC LAYER STATUS REPORT CONTROL PDU TRANSMITTING METHOD AND RELATED DEVICE

CROSS-REFERENCE TO RELATED APPLICATION(S)

This application is a 371 application of International Application No. PCT/CN2017/070185, filed on Jan. 4, 2017, the entire disclosure of which is hereby incorporated by reference.

TECHNICAL FIELD

The present disclosure relates to the field of communication technology, and specifically, to a method for transmitting an RLC layer status report control PDU and a related device.

BACKGROUND

In an existing mechanism for retransmission and feedback of Radio Link Control (RLC), the RLC will configure a sequence number for each PDU respectively when transmitting Protocol Data Units (PDUs), and a sending end sends the PDUs according to configured sequence numbers. Subsequently a receiving end feeds back a PDU receiving status of the receiving end to the sending end through a PDU status report (status report PDU). The sending end decides which PDUs to be retransmitted according to the PDU status report.

According to an LTE RLC protocol, the status report PDU fed back by the receiving end includes the maximum sequence number of PDUs currently successfully received by the receiving end and a sequence number of each PDU not successfully received. It can be seen that currently the status report PDU fed back by the receiving end has a single format which is inflexible. In some cases, it is difficult to meet the requirements of various scenarios.

SUMMARY

Implementations of the present disclosure provide a method for transmitting an RLC layer status report control PDU and a related device.

In a first aspect, an implementation of the present disclosure provides a method for transmitting an RLC layer status report control PDU, and the method includes: receiving, by a user equipment, configuration information sent by a network device, wherein the configuration information includes at least one control PDU format; and selecting, by the user equipment, a control PDU format from the at least one control PDU format to generate a status report control PDU, and reporting the status report control PDU.

In a second aspect, an implementation of the present disclosure provides a method for transmitting an RLC layer status report control PDU, and the method includes: generating, by a network device, configuration information, wherein the configuration information includes at least one control PDU format; sending, by the network device, the configuration information to a user equipment; and receiving, by the network device, a status report control PDU reported by the user equipment, wherein the status report control PDU is generated through a control PDU format selected by the user equipment from the at least one control PDU format.

In a third aspect, an implementation of the present disclosure provides a user equipment, including:
a receiving module, used for receiving configuration information sent by a network device, wherein the configuration information includes at least one control PDU format;
a processing module, used for selecting a control PDU format from the at least one control PDU format to generate a status report control PDU; and
a sending module, used for reporting the status report control PDU.

In a fourth aspect, an implementation of the present disclosure provides a network device, including:
a processing module, used for generating configuration information, wherein the configuration information includes at least one control PDU format;
a sending module, used for sending the configuration information to a user equipment; and
a receiving module, used for receiving a status report control PDU reported by the user equipment, wherein the status report control PDU is generated through a control PDU format selected by the user equipment from the at least one control PDU format.

In a fifth aspect, an implementation of the present disclosure provides a user equipment, including a processor, a memory, a transceiver and a bus; wherein,
the processor is connected with the memory and the transceiver through the bus and completes communication among the processor, the memory, and the transceiver;
the memory stores executable program codes, and the processor is used for calling executable program codes stored in the memory to execute the method in the first aspect of implementations of the present disclosure.

In a sixth aspect, an implementation of the present disclosure provides a network device, including a processor, a memory, a transceiver and a bus; wherein,
the processor is connected with the memory and the transceiver through the bus and completes communication among the processor, the memory, and the transceiver;
the memory stores executable program codes, and the processor is used for calling executable program codes stored in the memory to execute the method in the second aspect of implementations of the present disclosure.

In a seventh aspect, the present disclosure provides a computer storage medium for storing computer software instructions used by the user equipment provided in the fifth aspect of the implementation of the present disclosure, which includes programs designed for executing the first aspect of implementations of the present disclosure.

In an eighth aspect, the present disclosure provides a computer storage medium for storing computer software instructions used by the network device provided in the sixth aspect of the implementation of the present disclosure, which includes programs designed for executing the second aspect of implementations of the present disclosure.

In a ninth aspect, an implementation of the present disclosure provides a communication system, which includes the user equipment according to the third aspect of implementations of the present disclosure and the network device according to the fourth aspect of implementations of the present disclosure, or the communication system includes the user equipment according to the fifth aspect of implementations of the present disclosure and the network device according to the sixth aspect of implementations of the present disclosure.

These and other aspects of the present disclosure will be more readily understood in the description of following implementations.

BRIEF DESCRIPTION OF DRAWINGS

In order to explain technical solutions in implementations of the present disclosure or the prior art more clearly, drawings to be used in the description of the implementations or the prior art will be briefly introduced below. Apparently, the drawings in the following description are only some implementations of the present disclosure. For an ordinary skilled in the art, other drawings may be obtained according to those drawings without paying an inventive effort.

DETAILED DESCRIPTION

In order to enable one skilled person in the art to better understand solutions of the present disclosure, technical solutions in implementations of the present disclosure will be described clearly and completely below with reference to the drawings in the implementations of the present disclosure. Apparently, the described implementations are only part, but not all, of the implementations of the present disclosure. Based on the implementations of the present disclosure, all other implementations obtained by one ordinary skilled in the art without paying an inventive effort shall fall within the protection scope of the present disclosure.

Details are given below separately.

Terms "first", "second", "third" and "fourth" and the like in the description and claims of the present disclosure and the drawings are used for distinguishing different objects and not for describing a specific sequence. In addition, term "include" and "have" and any variations thereof are intended to cover non-exclusive inclusion. For example, a process, method, system, product, or device that includes a series of acts or units is not limited to the listed acts or units, but optionally also includes acts or units that are not listed, or optionally also includes other acts or units that are inherent to the process, method, product, or device.

"Implementation" mentioned in this disclosure means that a particular feature, structure, or characteristic described in combination with an implementation may be included in at least one implementation of the present disclosure. The appearance of the phrase in various places in the specification does not necessarily refer to the same implementation, nor is it an independent or alternative implementation mutually exclusive with other implementations. It is explicitly and implicitly understood by one skilled person in the art that implementations described in this disclosure may be combined with other implementations.

In the following, partial terms in the present disclosure will be explained to facilitate understanding by a skilled person in the art.

1) User Equipment (UE) is a device that provides voice and/or data connectivity to users, such as a handheld device with a wireless connection function, a vehicle-mounted device. Common terminals include, for example, mobile phones, tablet computers, notebook computers, palm computers, mobile internet devices (MIDs), wearable devices such as smart watches, smart bracelets, pedometers, etc.

2) A network device refers to a node device on a network side. For example, the network device may be a Radio Access Network (RAN) device on an access network side in a cellular network. The so-called RAN device is a device that connects terminals to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU). For another example, the network device may also be a node device in a Wireless Local Area Network (WLAN), such as an access controller (AC), a gateway, or a WIFI Access Point (AP).

3) A Protocol Data Unit (PDU) refers to protocol exchange information between peer layers of two devices in a hierarchical network structure, such as an Open System Interconnection model.

4) "Multiple" refers to two or more than two. "And/or" describes an association relationship of associated objects, indicating that there may be three relationships, for example, A and/or B may represent three situations: A alone, A and B at the same time, and B alone. Symbol "/" generally indicates that objects before and after the symbol "/" is in an "or" relationship.

Implementations of the present disclosure will be described below with reference to the accompanying drawings.

Figure 1:
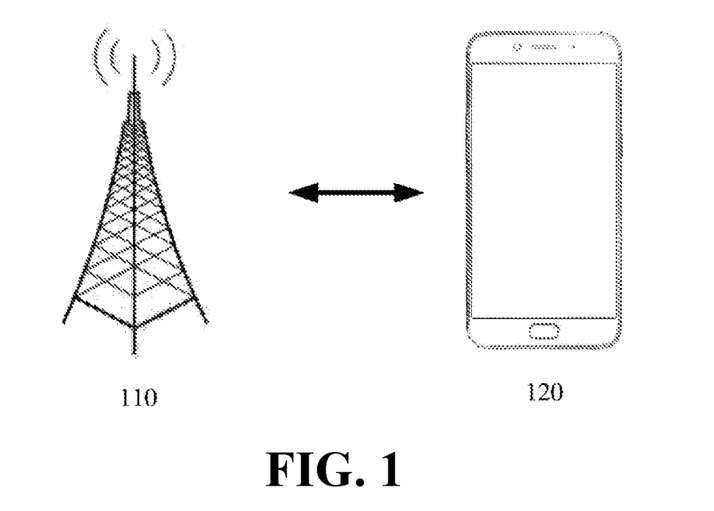
FIG. 1 is a schematic diagram of a network architecture provided by an implementation of the present disclosure.

Please refer to FIG. 1, which is a schematic diagram of a network architecture disclosed in an implementation of the present disclosure. The network architecture shown in FIG. 1 includes a network device 110 and a user equipment 120. The network device 110 generates configuration information, and then sends the configuration information to the user equipment 120. The configuration information includes at least one control PDU format. Upon receiving the configuration information, the user equipment 120 selects a control PDU format from the at least one control PDU format included in the configuration information to generate a status report control PDU. Finally, the user equipment 120 reports the generated status report control PDU. It can be seen that at least one control PDU format in the solution provided by the present disclosure is configured by the network device 110 for the user equipment 120. Compared with the prior art, the user equipment 120 in the solution generates a status report control PDU based on at least one control PDU format configured by the network device 110. The status report control PDU generated by the user equipment has various formats, which can meet the requirements of various scenarios in some cases.

Next, a method for transmitting an RLC layer status report control PDU provided by an implementation of the present disclosure will be described in detail in combination with the network architecture shown in FIG. 1.

Figure 2:
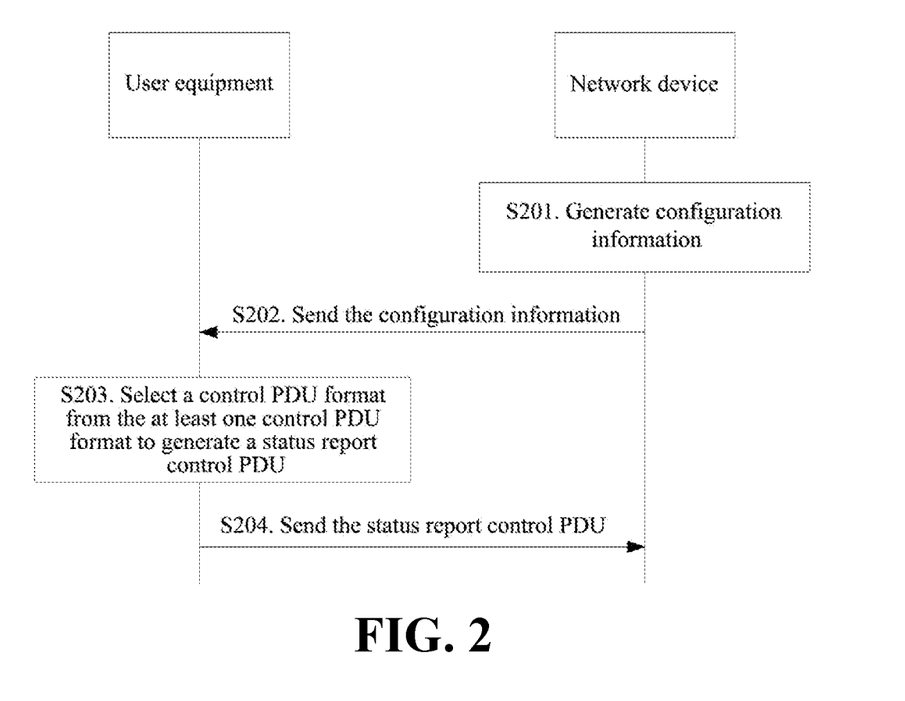
FIG. 2 is a schematic flowchart of a method for transmitting an RLC layer status report control PDU provided by an implementation of the present disclosure.

Please refer to FIG. 2. FIG. 2 is a schematic flowchart of a method for transmitting an RLC layer status report control PDU provided by an implementation of the present disclosure, and the method includes the following acts S201, S202, S203, and S204.

In S201, a network device generates configuration information, wherein the configuration information includes at least one control PDU format.

In S202, the network device sends the configuration information to a user equipment.

In S203, the user equipment receives the configuration information sent by the network device, and selects a control PDU format from the at least one control PDU format to generate a status report control PDU.

In S204, the user equipment reports the status report control PDU; and the network device receives the status report control PDU reported by the user equipment.

Usually the Chinese name of the status report PDU is 状态报告协议 数据单元 However, since this solution is applicable to an RLC layer, the Chinese name of the status report PDU is 状态报告控制协议 数据单元, which is referred to as status report control PDU for short in the present patent. The literal translation of the status report PDU format is 状态报告协议数据 单元格式. However, since this solution is applicable to the RLC layer, the Chinese name of the status report PDU format is 状态报告控制协议 数据单元格式. In addition, because the status report PDU belongs to a control protocol data unit, a control PDU format is used for indicating the status report PDU format in the present patent.

According to the solution provided by the present disclosure, the network device configures at least one control PDU format for the user equipment, and the user equipment selects a control PDU format from the at least one control PDU format to generate the status report control PDU. Compared with the prior art, the status report control PDU generated by the user equipment has various formats, which can meet the requirements of various scenarios in some cases.

In an implementation, the control PDU format includes a maximum sequence number of PDUs successfully received by the user equipment and a range of sequence numbers of PDUs incorrectly received.

The control PDU format includes the maximum sequence number of the PDUs successfully received by the user equipment and the range of the sequence numbers of PDUs incorrectly received, then the reported status report control PDU includes the maximum sequence number of the PDUs successfully received by the user equipment and the range of the sequence numbers of PDUs incorrectly received.

Figure 3:
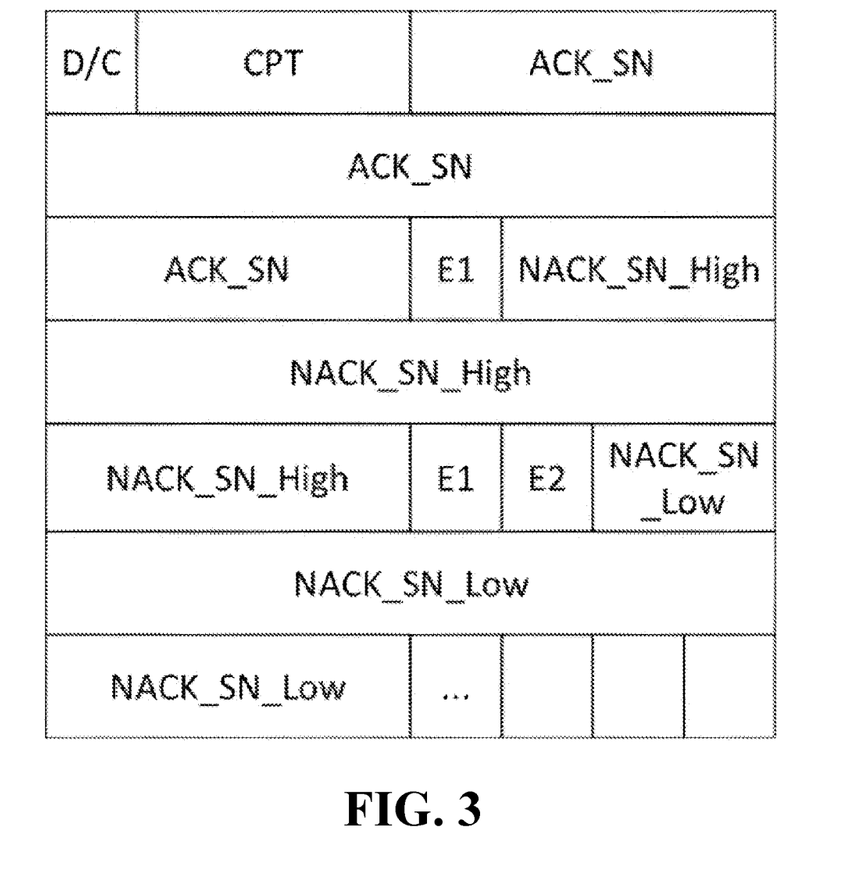
FIG. 3 is a schematic diagram of a control PDU format provided by an implementation of the present disclosure.

Please refer to FIG. 3. FIG. 3 is a schematic diagram of a control PDU format provided by an implementation of the present disclosure. FIG. 3 is an exemplary diagram of a control PDU format including the maximum sequence number of the PDUs successfully received by the user equipment and the range of the sequence numbers of PDUs incorrectly received. Wherein ACK_SN represents the maximum sequence number of the PDUs successfully received by the user equipment, and NACK_SN_LOW and NACK_SN_HIGH respectively represent a low limit sequence number and a high limit sequence number in the range of the sequence numbers of the PDUs incorrectly received by the user equipment.

Figure 4:
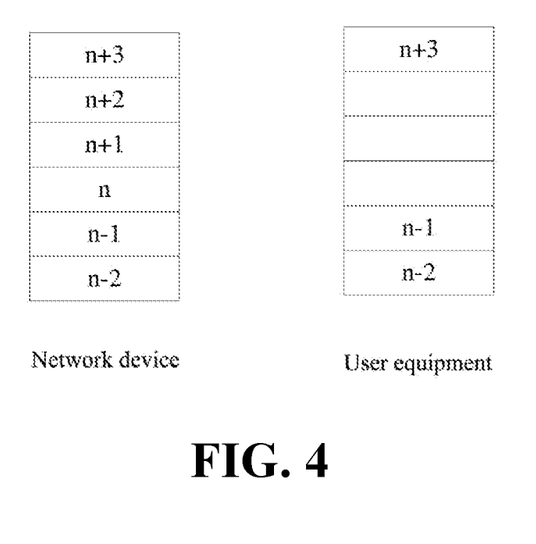
FIG. 4 is a schematic diagram of an example provided by an implementation of the present disclosure.

For example, as shown in FIG. 4, the network device has sent PDUs with sequence numbers being n−2, n−1 to n+3 respectively, and the user equipment has received PDUs with sequence numbers being n+3, n−2, n−1 respectively. On the user equipment side, it is found that the sequence numbers of the PDUs that have not been received are n to n+2, thus the user equipment will report the status report control PDU to the network device to inform the sequence numbers of the PDUs which have not been successfully received by the user equipment. In this example, according to the LTE RLC protocol in the prior art, the status report control PDU reported by the user equipment will contain the maximum sequence number of PDUs currently successfully received and a sequence number of each PDU unsuccessfully received, i.e. the status report control PDU will contain the sequence number n+3 and the sequence numbers n, n+1 and n+2 of PDUs unsuccessfully received. It can be seen that the status report control PDU reported by the user equipment needs to include a sequence number of each PDU that has not been successfully received, and the overhead is large.

In the example shown in FIG. 4, with this solution, the status report control PDU reported by the user equipment only needs to include the sequence number n+3, the sequence number n and the sequence number n+2. It can be seen that when a large quantity of PDUs need to be instructed to retransmit, the receiving end only feeds back the range of the sequence numbers of retransmitted PDU packets, without feeding back a sequence number of each retransmitted PDU, thus greatly saving feedback overhead of the RLC layer.

Further, the range of the sequence numbers includes a high limit sequence number and a low limit sequence number. When the maximum sequence number of the PDUs successfully received by the user equipment is adjacent to the high limit sequence number, the control PDU format includes the maximum sequence number of the PDUs successfully received by the user equipment and the low limit sequence number.

The control PDU format includes the maximum sequence number of the PDUs successfully received by the user equipment and a low limit sequence number of the range of the sequence numbers of the PDUs incorrectly received, then the reported status report control PDU includes the maximum sequence number of the PDUs successfully received by the user equipment and a low limit sequence number of the range of the sequence numbers of the PDUs incorrectly received.

Figure 5:
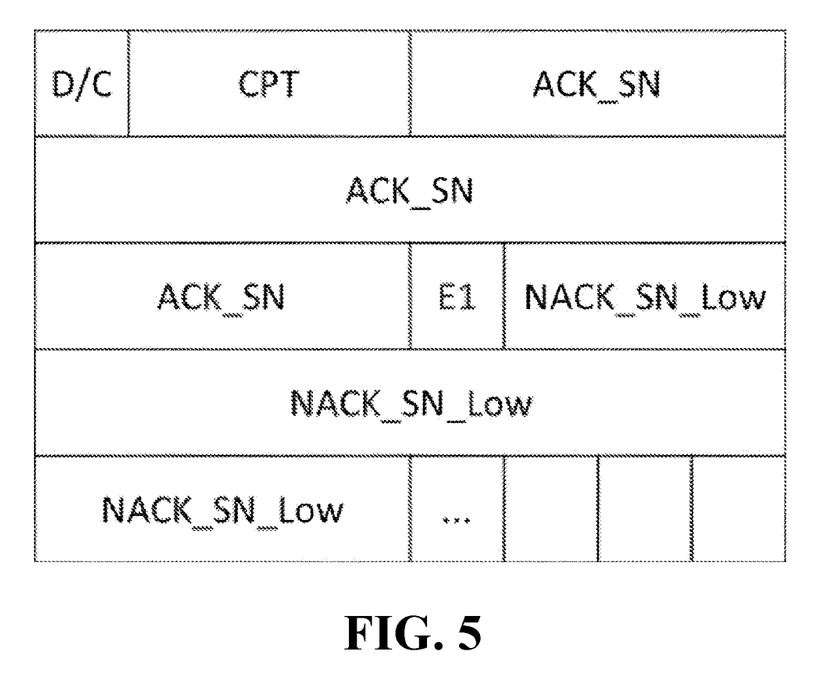
FIG. 5 is a schematic diagram of another control PDU format provided by an implementation of the present disclosure.

For example, in the example shown in FIG. 4, the maximum sequence number of the PDU successfully received by the user equipment is n+3, and the low limit and high limit of the range of the sequence numbers of the PDUs incorrectly received by the user equipment are n and n+2, respectively. Wherein, n+2 and n+3 are adjacent. In this case, the status report control PDU reported by the user equipment only needs to include the sequence number n+3 and the sequence number n. The feedback overhead of the RLC layer is further saved. An exemplary diagram of the control PDU format including the maximum sequence number of the PDUs successfully received by the user equipment and a low limit sequence number of the range of the sequence numbers of the PDUs incorrectly received is as shown in FIG. 5, which is a schematic diagram of another control PDU format provided by an implementation of the present disclosure.

In an implementation, the control PDU format includes the maximum sequence number of PDUs successfully received by the user equipment and multiple ranges of sequence numbers of PDUs incorrectly received.

The format of the control PDU includes the maximum sequence number of the PDUs successfully received by the user equipment and the multiple ranges of the sequence numbers of the PDUs incorrectly received, then the reported status report control PDU includes the maximum sequence number of the PDUs successfully received by the user equipment and the multiple ranges of the sequence numbers of the PDUs incorrectly received.

Figure 6:
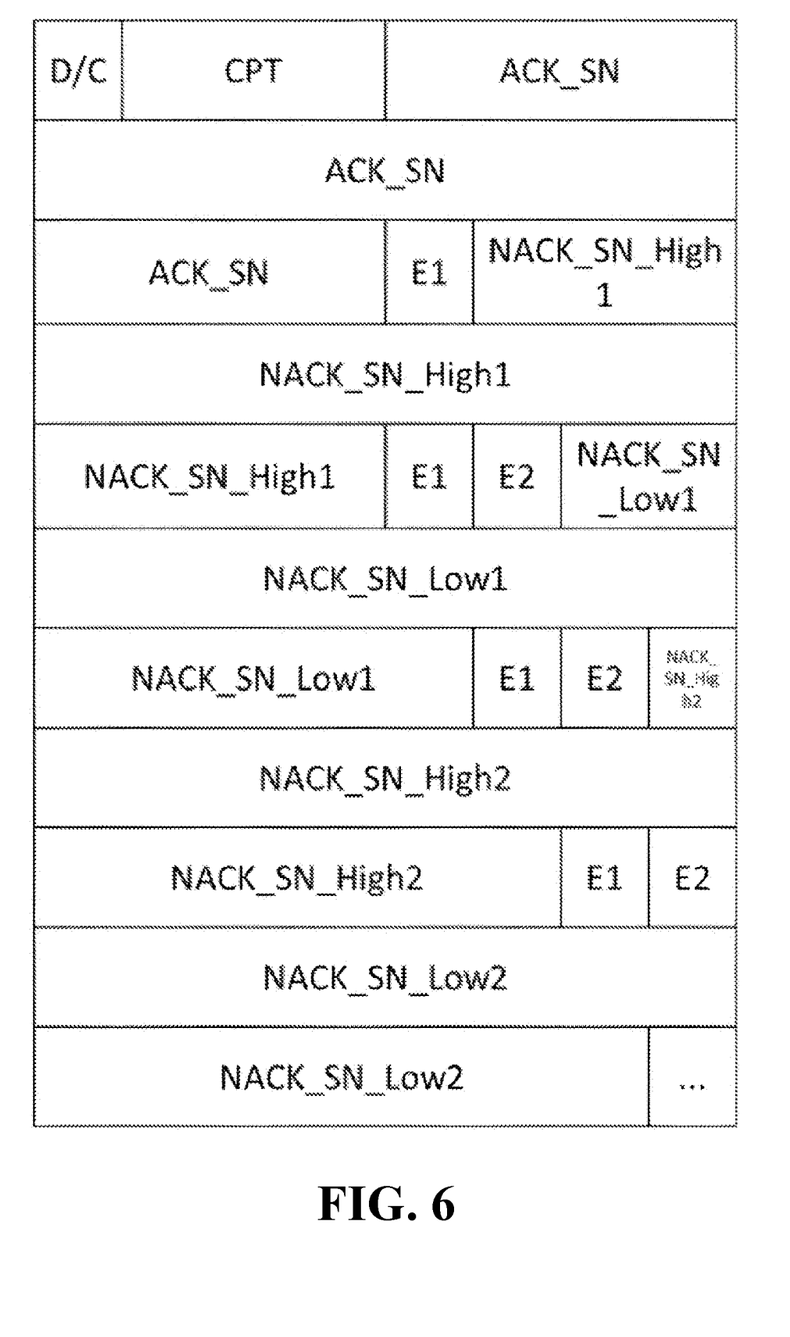
FIG. 6 is a schematic diagram of yet another control PDU format provided by an implementation of the present disclosure.

Please refer to FIG. 6. FIG. 6 is a schematic diagram of yet another control PDU format provided by an implementation of the present disclosure. FIG. 6 is an exemplary diagram of the control PDU format including the maximum sequence number of PDUs successfully received by the user equipment and multiple ranges of sequence numbers of PDUs incorrectly received.

For example, the sequence numbers of the PDUs that the network device has sent are n~n+12, the sequence numbers of PDUs that the user equipment has received are n+3, n+8, n+12, and on the user equipment side it is found that the sequence numbers of the PDUs that are not received are n, n+1, n+2, n+4, n+5, n+6, n+9, n+10, n+11, then the status report control PDU generated by the user equipment by using the control PDU format shown in FIG. 6 includes the maximum sequence number n+12 of the PDUs successfully received by the user equipment, and the multiple ranges of the sequence numbers of the PDUs incorrectly received which are n~n+2, n+4~n+6, n+9~n+11.

In an implementation, the control PDU format includes the maximum sequence number of the PDUs successfully received by the user equipment and a sequence number of each PDU incorrectly received.

The control PDU format includes the maximum sequence number of the PDUs successfully received by the user equipment and a sequence number of each PDU incorrectly received, then the reported status report control PDU includes the maximum sequence number of the PDUs successfully received by the user equipment and a sequence number of each PDU incorrectly received.

Figure 7:
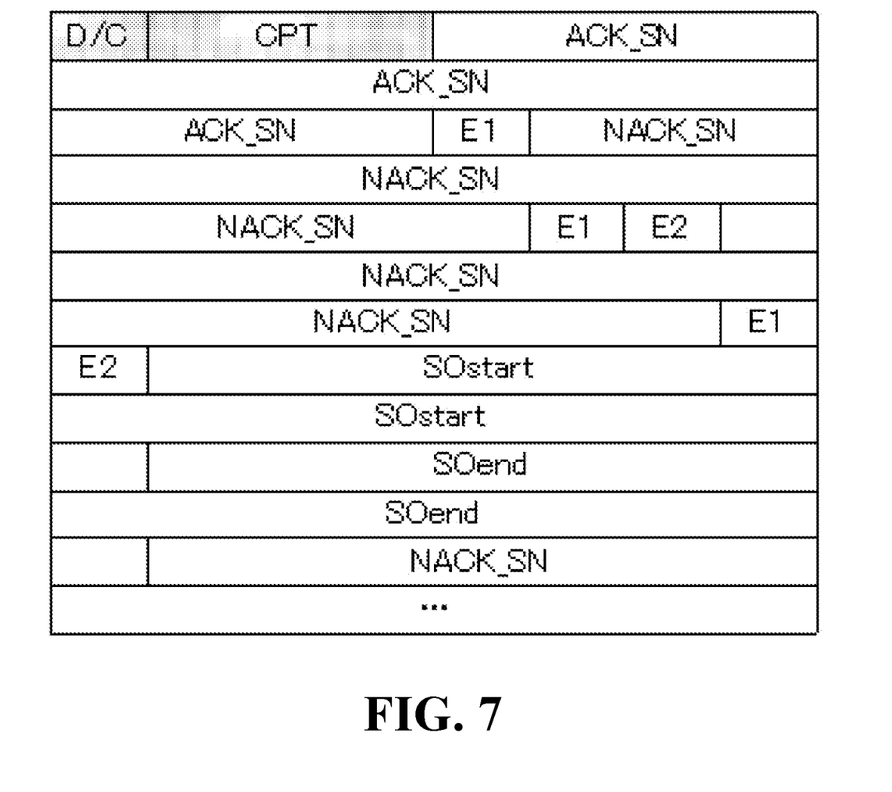
FIG. 7 is a schematic diagram of still another control PDU format provided by an implementation of the present disclosure.

Please refer to FIG. 7. FIG. 7 is a schematic diagram of yet another control PDU format provided by an implementation of the present disclosure. FIG. 7 is an exemplary diagram of the control PDU format including the maximum sequence number of PDUs successfully received by the user equipment and a sequence number of each PDU incorrectly received.

For example, the network device has sent PDUs with sequence numbers being n to n+7, and the user equipment has received the PDUs with the sequence numbers being n to n+5. On the user equipment side, it is found that the sequence numbers of the PDUs not received are n+6 to n+7, then the status report control PDU reported by the user equipment includes the maximum sequence number n+5 of the PDUs successfully received by the user equipment, and a sequence number of each PDU incorrectly received, n+6 and n+7.

In addition, some parameters in FIGS. 3, 5, 6 and 7 are explained as follows: Control PDU Type (CPT); Extension bit 1 (E1) and Extension bit 2 (E2), wherein E1 and E2 represent that a series of NACKs or other fields will follow; NACK_SN, which represents the sequence number of the PDU incorrectly received by the user equipment; a combined field of SOstart and SOend, wherein SOstart and SOend jointly indicate AMDPDU that has been detected as lost in the receiving portion of AMRLC, wherein SOstart indicates a starting position of the lost portion in the AMDPDU, and SOend indicates an ending position of the lost portion in the AMDPDU, both in bytes.

In an implementation, a specific implementation mode of selecting, by the user equipment, a control PDU format from the at least one control PDU format is: selecting, by the user equipment, the control PDU format from the at least one control PDU format according to a situation of incorrectly receiving the PDUs.

Further, when a quantity of the PDUs incorrectly received by the user equipment is greater than or equal to a preset threshold value, or when the quantity of the PDUs incorrectly received by the user equipment is greater than or equal to the preset threshold value and the sequence numbers of the PDUs incorrectly received are continuous, the selected control PDU format includes the maximum sequence number of PDUs successfully received by the user equipment and a range of the sequence numbers of the PDUs incorrectly received.

Further, when the quantity of the PDUs incorrectly received by the user equipment is greater than or equal to the preset threshold value and the sequence numbers of the PDUs incorrectly received are discontinuous, the selected control PDU format includes the maximum sequence number of the PDUs successfully received by the user equipment and the multiple ranges of the sequence numbers of the PDUs incorrectly received.

Further, when the quantity of PDUs incorrectly received by the user equipment is less than the preset threshold value, the selected control PDU format includes the maximum sequence number of the PDUs successfully received by the user equipment and a sequence number of each PDU incorrectly received.

For example, the network device configures multiple control PDU formats for the user equipment such as 4 control PDU formats shown in FIG. 3, FIG. 5, FIG. 6 and FIG. 7. As an example, assuming that the preset threshold value is 3, the network device has sent PDUs with sequence numbers being n−2, n−1 to n+3, and the sequence numbers of the PDUs not received by the user equipment are n to n+2. It can be seen that the quantity of the PDUs incorrectly received by the user equipment is greater than 3, and the sequence numbers of the PDUs incorrectly received are continuous. Therefore, the user equipment selects the control PDU format shown in FIG. 3 to generate a status report control PDU. As another example, assuming that the preset threshold value is 3, the network device has sent PDUs with sequence numbers being n to n+10, and the sequence numbers of the PDUs not received by the user equipment are n, n+1, n+2, n+4, n+5, n+6. It can be seen that the quantity of PDUs incorrectly received by the user equipment is greater than 3, and the sequence numbers of the PDUs incorrectly received are discontinuous. Therefore, the user equipment selects the control PDU format shown in FIG. 6 to generate a status report control PDU. As another example, assuming that the preset threshold value is 3, the network device has sent PDUs with sequence numbers being n to n+10, and the sequence numbers of the PDUs not received by the user equipment are n and n+1. It can be seen that the quantity of the PDUs incorrectly received by the user equipment is greater than 3, and the sequence numbers of the PDUs incorrectly received are discontinuous. Therefore, the user equipment selects the control PDU format shown in FIG. 7 to generate a status report control PDU.

It can be seen that when the network device configures multiple control PDU formats for the user equipment, the user equipment selects which control PDU format to be used to generate the status report control PDU according to the situation of incorrectly receiving the PDUs by the user equipment itself, thus the sequence numbers of the PDUs incorrectly received reported by the user equipment can be more accurate on the premise of ensuring the reduction of feedback overhead of the RLC layer.

In an implementation, the configuration information further includes a first usage configuration of the at least one control PDU format, and a specific implementation mode of selecting, by the user equipment, a control PDU format from the at least one control PDU format is: selecting, by the user equipment, the control PDU format from the at least one control PDU format according to the first usage configuration of the at least one control PDU format.

The first usage configuration includes a usage time of the at least one control PDU format. As an example, the usage time of the control PDU format shown in FIG. 3 is 10:00 am to 11:00 am, during which the user equipment generates a status report control PDU by using the control PDU format shown in FIG. 3.

It can be seen that by statically configuring the usage configuration of the at least one control PDU format, no subsequent network device may be needed to instruct, through other signaling, the user equipment to use which control PDU format to generate the status report control PDU, thus saving the overhead of resources.

In an implementation, the method further includes:
sending, by the network device, indication information to the user equipment, wherein the indication information includes a second usage configuration of the at least one control PDU format; receiving, by the user equipment, the indication information sent by the network device; selecting, by the user equipment, a control PDU format from the at least one control PDU format according to the second usage configuration of the at least one control PDU format.

The second usage configuration includes a usage time of the at least one control PDU format. As an example, the usage time of the control PDU format shown in FIG. 6 is from 13:00 am to 18:00 am, during which the user equipment generates a status report control PDU by using the control PDU format shown in FIG. 6.

It can be seen that subsequently, the network device dynamically instructs, through the indication information, the user equipment to use which control PDU format to generate the status report control PDU, thus the user equipment is enabled to generate the status report control PDU more flexibly, and in some cases requirements of various scenarios can be met.

Figure 8:
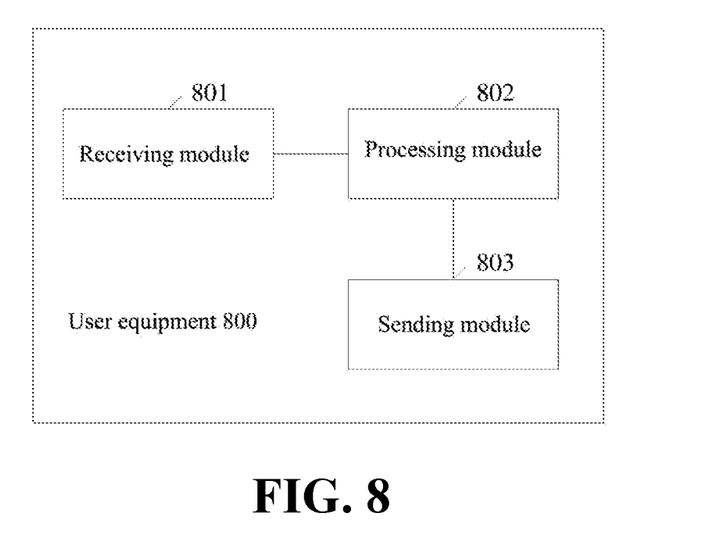
FIG. 8 is a structural schematic diagram of a user equipment provided by an implementation of the present disclosure.

An implementation of the present disclosure also provides a user equipment 800, as shown in FIG. 8, which includes a receiving module 801, a processing module 802, and a sending module 803.

The receiving module 801 is used for receiving configuration information sent by a network device, wherein the configuration information includes at least one control PDU format.

The processing module 802 is used for selecting a control PDU format from the at least one control PDU format to generate a status report control PDU.

The sending module 803 is used for reporting the status report control PDU.

In an implementation, the control PDU format includes the maximum sequence number of PDUs successfully received by the user equipment and a range of sequence numbers of PDUs incorrectly received.

In an implementation, the range of the sequence numbers includes a high limit sequence number and a low limit sequence number. When the maximum sequence number of the PDUs successfully received by the user equipment is adjacent to the high limit sequence number, the control PDU format includes the maximum sequence number of the PDUs successfully received by the user equipment and the low limit sequence number.

In an implementation, the control PDU format includes the maximum sequence number of PDUs successfully received by the user equipment and multiple ranges of sequence numbers of PDUs incorrectly received.

In an implementation, the control PDU format includes the maximum sequence number of PDUs successfully received by the user equipment and a sequence number of each PDU incorrectly received.

In an implementation, the processing module 802 is specifically used for: selecting a control PDU format from the at least one control PDU format according to a situation of incorrectly receiving the PDU.

In an implementation, when a quantity of PDUs incorrectly received by the user equipment is greater than or equal to a preset threshold value, or when the quantity of the PDUs incorrectly received by the user equipment is greater than or equal to the preset threshold value and the sequence numbers of the PDUs incorrectly received are continuous, the selected control PDU format includes the maximum sequence number of PDUs successfully received by the user equipment and a range of the sequence numbers of the PDUs incorrectly received.

In an implementation, when the quantity of the PDUs incorrectly received by the user equipment is greater than or equal to the preset threshold value and the sequence numbers of the PDUs incorrectly received are discontinuous, the selected control PDU format includes the maximum sequence number of PDUs successfully received by the user equipment and the multiple ranges of the sequence numbers of the PDUs incorrectly received.

In an implementation, when the quantity of PDUs incorrectly received by the user equipment is less than the preset threshold value, the selected control PDU format includes the maximum sequence number of PDUs successfully received by the user equipment and a sequence number of each PDU incorrectly received.

In an implementation, the configuration information further includes a first usage configuration of the at least one control PDU format, and the processing module 802 is specifically used for: selecting a control PDU format from the at least one control PDU format according to the first usage configuration of the at least one control PDU format.

In an implementation, the receiving module 801 is further used for receiving indication information sent by the network device, wherein the indication information includes a second usage configuration of the at least one control PDU format; the processing module 802 is specifically used for selecting the control PDU format from the at least one control PDU format according to the second usage configuration of the at least one control PDU format.

It should be noted that the above-mentioned modules (the receiving module 801, the processing module 802, and the transmitting module 803) are used for performing the relevant acts of the above-mentioned method.

In this implementation, the user equipment 800 is presented in the form of a module. "Module" here may refer to an application-specific integrated circuit (ASIC), a processor and memory that execute one or more software or firmware programs, an integrated logic circuit, and/or other devices that may provide the above-mentioned functions. In addition, the above-mentioned processing module 802 can be implemented by the processor 1001 of the user equipment shown in FIG. 10, and the receiving module 801 and the transmitting module 803 can be implemented by the transceiver 1003 of the user equipment shown in FIG. 10.

Figure 9:
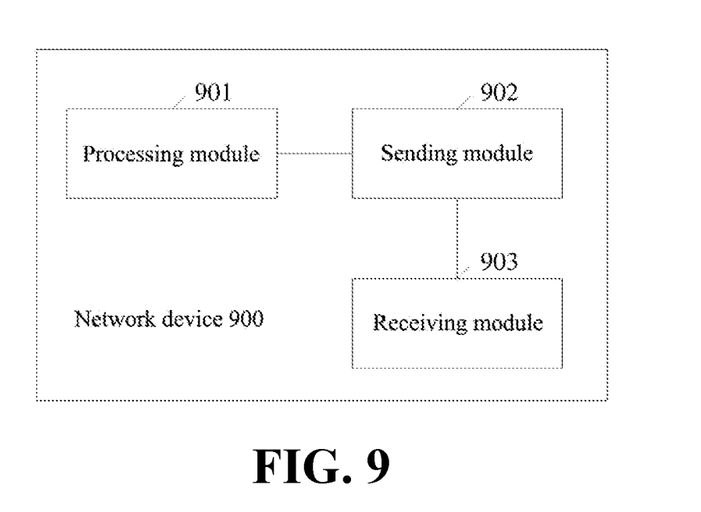
FIG. 9 is a structural schematic diagram of a network device provided by an implementation of the present disclosure.

An implementation of the present disclosure also provides a network device 900, as shown in FIG. 9, which includes a processing module 901, a sending module 902, and a receiving module 903.

The processing module 901 is used for generating configuration information, wherein the configuration information includes at least one control PDU format.

The sending module 902 is used for sending the configuration information to a user equipment.

The receiving module 903 is used for receiving a status report control PDU reported by the user equipment, wherein the status report control PDU is generated through a control PDU format selected by the user equipment from the at least one control PDU format.

In an implementation, the control PDU format includes the maximum sequence number of PDUs successfully received by the user equipment and a range of sequence numbers of PDUs incorrectly received.

In an implementation, the range of the sequence numbers includes a high limit sequence number and a low limit sequence number. When the maximum sequence number of the PDUs successfully received by the user equipment is adjacent to the high limit sequence number, the control PDU format includes the maximum sequence number of the PDU successfully received by the user equipment and the low limit sequence number.

In an implementation, the control PDU format includes the maximum sequence number of the PDUs successfully received by the user equipment and multiple ranges of the sequence numbers of the PDUs incorrectly received.

In an implementation, the control PDU format includes the maximum sequence number of the PDUs successfully received by the user equipment and a sequence number of each PDU incorrectly received.

In an implementation, the configuration information further includes a first usage configuration of the at least one control PDU format, wherein the first usage configuration is used for selecting, by the user equipment, a control PDU format from the at least one control PDU format.

In an implementation, the sending module 902 is further used for sending indication information to the user equipment, wherein the indication information includes a second usage configuration of the at least one control PDU format, and the second usage configuration is used for selecting, by the user equipment, a control PDU format from the at least one control PDU format.

It should be noted that the above-mentioned modules (the processing module 901, the sending module 902, and the receiving module 903) are used for executing the relevant acts of the above-mentioned method.

In this implementation, the network device 900 is presented in the form of a module. "Module" here may refer to an application-specific integrated circuit (ASIC), a processor and memory that execute one or more software or firmware programs, an integrated logic circuit, and/or other devices that may provide the above-mentioned functions. In addition, the above processing module 901 may be implemented by the processor 1101 of the user equipment shown in FIG. 11, and the transmitting module 902 and the receiving module 903 may be implemented by the transceiver 1103 of the user equipment shown in FIG. 11.

Figure 10:
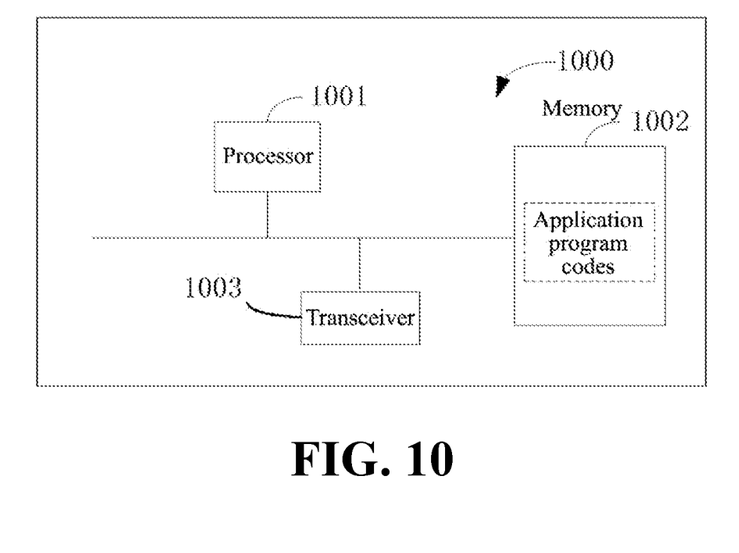
FIG. 10 is a structural schematic diagram of another user equipment provided by an implementation of the present disclosure.

As shown in FIG. 10, the user equipment 1000 may be implemented with the structure in FIG. 10, and the user equipment 1000 includes at least one processor 1001, at least one memory 1002, and at least one transceiver 1003. The processor 1001 is connected with the memory 1002 and the transceiver 1003 through the communication bus and completes communication among the processor 1001, the memory 1002, and the transceiver 1003.

The processor 1001 may be a general-purpose central processing unit (CPU), a microprocessor, an application-specific integrated circuit (ASIC), or one or more integrated circuits for controlling execution of programs in the above solution.

The transceiver 1003 is used for communicating with other devices or communication networks, such as an Ethernet, a Radio Access Network (RAN), a Wireless Local Area Network (WLAN).

The memory 1002 may be a read-only memory (ROM) or other types of static storage device that may store static information and instructions, a random access memory (RAM), or other types of dynamic storage devices that may store information and instructions. It may also be an electrically erasable programmable read-only memory (EEPROM), a Compact Disc Read-Only Memory (CD-ROM), or other optical storage, optical disk storage (including compact disk, laser disk, optical disk, digital universal optical disk, Blu-ray disk, etc.), magnetic disk storage medium or other magnetic storage device, or any other medium capable of carrying or storing desired program codes in the form of instructions or data structures and capable of being accessed by a computer, but is not limited thereto. The memory may exist independently and be connected to the processor through a bus. The memory may also be integrated with the processor.

The memory 1002 is used for storing application program codes for executing the above solution, and the execution is controlled by the processor 1001. The processor 1001 is used for executing application program codes stored in the memory 1002.

The codes stored in the memory 1002 can execute the above method for transmitting an RLC layer status report control PDU implemented by the user equipment provided above, such as receiving configuration information sent by the network device, wherein the configuration information includes at least one control PDU format; selecting a control PDU format from the at least one control PDU format to generate a status report control PDU, and reporting the status report control PDU.

Figure 11:
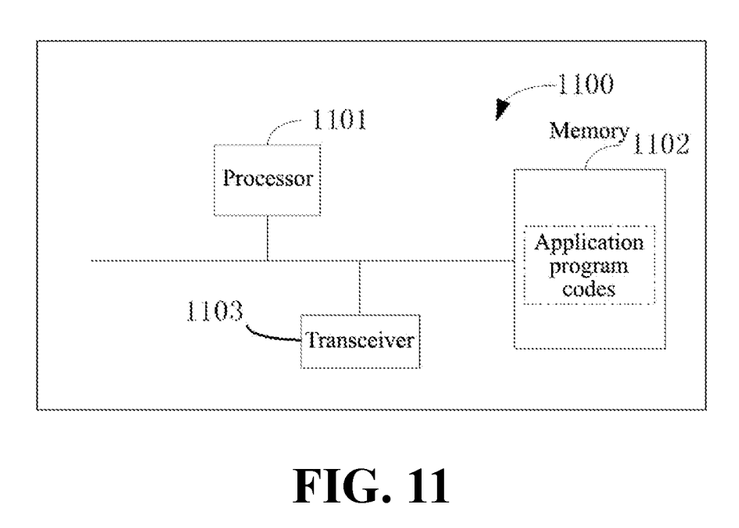
FIG. 11 is a structural schematic diagram of another network device provided by an implementation of the present disclosure.

As shown in FIG. 11, the network device 1100 may be implemented with the structure in FIG. 11, and the network device 1100 includes at least one processor 1101, at least one memory 1102, and at least one transceiver 1103. The processor 1101 is connected to the memory 1102 and the transceiver 1103 through the communication bus and completes communication among the processor 1101, the memory 1102, and the transceiver 1103.

The processor 1101 may be a general-purpose central processing unit (CPU), a microprocessor, an application-specific integrated circuit (ASIC), or one or more integrated circuits for controlling execution of programs in the above solution.

The transceiver 1103 is used for communicating with other devices or communication networks, such as an Ethernet, a Radio Access Network (RAN), a Wireless Local Area Network (WLAN).

The memory 1102 may be a read-only memory (ROM) or other types of static storage device that may store static information and instructions, random access memory (RAM), or other types of dynamic storage devices that may store information and instructions. It may also be an electrically erasable programmable read-only memory (EEPROM), a Compact Disc Read-Only Memory (CD-ROM), or other optical storage, optical disk storage (including compact disk, laser disk, optical disk, digital universal optical disk, Blu-ray disk, etc.), magnetic disk storage medium or other magnetic storage device, or any other medium capable of carrying or storing desired program codes in the form of instructions or data structures and capable of being accessed by a computer, but is not limited thereto. The memory may exist independently and be connected to the processor through a bus. The memory may also be integrated with the processor.

The memory 1102 is used for storing application program codes for executing the above solution, and the execution is controlled by the processor 1101. The processor 1101 is used for executing application program codes stored in the memory 1102.

The codes stored in the memory 1102 can execute the above method for transmitting an RLC layer status report control PDU implemented by the user equipment provided above, such as generating configuration information, wherein the configuration information includes at least one control PDU format; sending the configuration information to the user equipment; receiving a status report control PDU reported by the user equipment, wherein the status report control PDU is generated through a control PDU format selected by the user equipment from the at least one control PDU format.

An implementation of the present disclosure also provides a communication system, which includes the user equipment 800 shown in FIG. 8 and the network device 900 shown in FIG. 9, or includes the user equipment 1000 shown in FIG. 10 and the network device 1100 shown in FIG. 11.

An implementation of the present disclosure also provides a computer storage medium, wherein the computer storage medium can store a program, and when the program is executed, the execution of the program includes part or all of acts of any method for transmitting an RLC layer status report control PDU described in the above method implementation.

An implementation of the present disclosure also provides another computer storage medium, wherein the computer storage medium may store a program, and when the program is executed, the execution of the program includes part or all acts of any method for transmitting an RLC layer status report control PDU described in the above method implementation.

It should be noted that for sake of conciseness, the aforementioned method implementations are all expressed as a series of action combinations, but one skilled person in the art should know that the present disclosure is not limited by the described sequence of acts, since according to the present disclosure, some acts can be performed with other sequences or simultaneously. Secondly, one skilled person in the art should also know that the implementations described in the specification are all preferred implementations, and the actions and modules involved are not necessary for the present disclosure.

In the above-mentioned implementations, the description of each implementation has its own emphasis, a part which is not described in detail in an implementation can be referred to related descriptions in other implementations.

In several implementations provided by the present disclosure, it should be understood that the disclosed apparatus may be implemented in other ways. For example, the apparatus implementations described above are only illustrative, for example, the categorization of the units is only a logical function categorization, and there may be other categorization manners in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical or other forms.

The units described as separated components may or may not be physically separated, and a component shown as a unit may or may not be a physical unit, i.e., it may be located in one place or may be distributed over multiple network units. Some or all of the elements can be selected according to actual requirements to achieve the purpose of the present implementations.

In addition, various functional units in various implementations of the present disclosure may be integrated in one processing unit, or various functional units may be physically present separately, or two or more units may be integrated into one unit. The above-mentioned integrated unit can be implemented in a form of hardware, or can be implemented in a form of a software functional unit.

The integrated unit may be stored in a computer readable storage if implemented in a form of a software functional unit and sold or used as a separate product. Based on this understanding, a technical solution of the present disclosure, in essence, or a part contributing to the prior art, or all or part of the technical solution, may be embodied in a form of a software product. The computer software product is stored in a storage and includes some instructions to make a computer device (which may be a personal computer, a server, or a network device) to perform all or parts of the acts of the method described in various implementations of the present disclosure. The aforementioned storage includes various media capable of storing program codes such as U disk, Read-Only Memory (ROM), Random Access Memory (RAM), mobile hard disk, magnetic disk or optical disk.

One ordinary skilled in the art can understand that all or part of the acts in the various methods of the above-mentioned implementations can be accomplished by instructing relevant hardware through a program, wherein the program can be stored in a computer readable storage, the storage may include a flash disk, Read-Only Memory (ROM), Random Access Memory (RAM), a magnetic disk or an optical disk, etc.

The implementations of the present disclosure are described above in detail. In the disclosure, specific examples are used to explain the principle and implementation mode of the present disclosure. The description of the above implementations is only used to help understanding the method and core ideas of the present disclosure. For one ordinary skilled in the art, modifications can be made in the specific implementation mode and within the application range according to the ideas of the present disclosure. In conclusion, the contents of the present specification should not be construed as limitations on the present disclosure.

What I claim is:

1. A method for transmitting a radio link control (RLC) layer status report protocol data unit (PDU), comprising:

receiving, by a user equipment, configuration information sent by a network device that configures multiple status report PDU formats for the user equipment; and generating a status report PDU according to a status report PDU format selected by the user equipment from among the multiple status report PDU formats, and reporting the status report PDU, wherein the status report PDU format comprises a maximum sequence number of PDUs successfully received by the user equipment and at least one of a range of sequence numbers of PDUs unsuccessfully received or a plurality of ranges of sequence numbers of PDUs unsuccessfully received, wherein when a quantity of the PDUs unsuccessfully received by the user equipment is greater than or equal to a preset threshold value or when the quantity of the PDUs unsuccessfully received by the user equipment is greater than or equal to the preset threshold value and sequence numbers of the PDUs unsuccessfully received are continuous, the selected status report PDU format comprises the maximum sequence number of PDUs successfully received by the user equipment and further comprises the range of the sequence numbers of the PDUs unsuccessfully received, and when a quantity of the PDUs unsuccessfully received by the user equipment is greater than or equal to a preset threshold value and sequence numbers of the PDUs unsuccessfully received are discontinuous, the selected status report PDU format comprises the maximum sequence number of PDUs successfully received by the user equipment and further comprises the plurality of ranges of the sequence numbers of the PDUs unsuccessfully received, and when a quantity of the PDUs unsuccessfully received by the user equipment is less than the present threshold value, the selected status report PDU format comprises the maximum sequence number of PDUs successfully received by the user equipment and further comprises a sequence number of each PDU unsuccessfully received.

2. The method of claim 1, wherein the range of the sequence numbers comprises a high limit sequence number and a low limit sequence number; and when the maximum sequence number of the PDUs successfully received by the user equipment is adjacent to the high limit sequence number, the status report PDU format comprises the maximum sequence number of the PDUs successfully received by the user equipment and the low limit sequence number.

3. A method for transmitting a radio link control (RLC) layer status report control protocol data unit (PDU), comprising:

generating, by a network device, configuration information, wherein the network device that configures for a user equipment multiple status report PDU formats;

sending, by the network device, the configuration information to the user equipment; and receiving, by the network device, a status report PDU reported by the user equipment, wherein the status report PDU is generated through a status report PDU format selected by the user equipment from among the multiple status report PDU formats, wherein the status report PDU format comprises a maximum sequence number of PDUs successfully received by the user equipment and at least one of a range of sequence numbers of PDUs unsuccessfully received or a plurality of ranges of sequence numbers of PDUs unsuccessfully received, wherein when a quantity of the PDUs unsuccessfully received by the user equipment is greater than or equal to a preset threshold value or when the quantity of the PDUs unsuccessfully received by the user equipment is greater than or equal to the preset threshold value and sequence numbers of the PDUs unsuccessfully received are continuous, the selected status report PDU format comprises the maximum sequence number of PDUs successfully received by the user equipment and further comprises the range of the sequence numbers of the PDUs unsuccessfully received, wherein when a quantity of the PDUs unsuccessfully received by the user equipment is greater than or equal to a preset threshold value and sequence numbers of the PDUs unsuccessfully received are discontinuous, the selected status report PDU format comprises the maximum sequence number of PDUs successfully received by the user equipment and further comprises the plurality of ranges of the sequence numbers of the PDUs unsuccessfully received, and when a quantity of the PDUs unsuccessfully received by the user equipment is less than the present threshold value, the selected status report PDU format comprises the maximum sequence number of PDUs successfully received by the user equipment and further comprises a sequence number of each PDU unsuccessfully received.

4. The method of claim 3, wherein the range of the sequence numbers comprises a high limit sequence number and a low limit sequence number; and when the maximum sequence number of the PDUs successfully received by the user equipment is adjacent to the high limit sequence number, the status report PDU format comprises the maximum sequence number of the PDUs successfully received by the user equipment and the low limit sequence number.

5. A user equipment, comprising: a processor and a transceiver; wherein the transceiver is configured to receive configuration information sent by a network device that configures multiple status report PDU formats;

the processor is configured to generate a status report PDU according to a status report PDU format selected from among the multiple status report PDU formats;

the transceiver is further configured to report the status report PDU;

the status report PDU format comprises a maximum sequence number of PDUs successfully received by the user equipment and at least one of a range of sequence numbers of PDUs unsuccessfully received or a plurality of ranges of sequence numbers of PDUs unsuccessfully received;

when a quantity of the PDUs unsuccessfully received by the user equipment is greater than or equal to a preset threshold value or when the quantity of the PDUs unsuccessfully received by the user equipment is greater than or equal to the preset threshold value and sequence numbers of the PDUs unsuccessfully received are continuous, the selected status report PDU format comprises the maximum sequence number of PDUs successfully received by the user equipment and further comprises the range of the sequence numbers of the PDUs unsuccessfully received;

when a quantity of the PDUs unsuccessfully received by the user equipment is greater than or equal to a preset threshold value and sequence numbers of the PDUs unsuccessfully received are discontinuous, the selected status report PDU format comprises the maximum sequence number of PDUs successfully received by the user equipment and further comprises the plurality of ranges of the sequence numbers of the PDUs unsuccessfully received, and when a quantity of the PDUs unsuccessfully received by the user equipment is less than the present threshold value, the selected status report PDU format comprises the maximum sequence number of PDUs successfully received by the user equipment and further comprises a sequence number of each PDU unsuccessfully received.

6. The user equipment of claim 5, wherein the range of the sequence numbers comprises a high limit sequence number and a low limit sequence number; and when the maximum sequence number of the PDUs successfully received by the user equipment is adjacent to the high limit sequence number, the status report PDU format comprises the maximum sequence number of the PDUs successfully received by the user equipment and the low limit sequence number.

7. A network device, comprising: a processor and a transceiver; wherein
the processor is configured to generate configuration information, wherein the processor configures for a user equipment multiple status report PDU formats;
the transceiver is configured to send the configuration information to the user equipment;
the transceiver is further configured to receive a status report PDU reported by the user equipment, wherein the status report PDU is generated through a status report PDU format selected by the user equipment from among the multiple status report PDU formats;
the status report PDU format comprises a maximum sequence number of PDUs successfully received by the user equipment and at least one of a range of sequence numbers of PDUs unsuccessfully received or a plurality of ranges of sequence numbers of PDUs unsuccessfully received;

when a quantity of the PDUs unsuccessfully received by the user equipment is greater than or equal to a preset threshold value or when the quantity of the PDUs unsuccessfully received by the user equipment is greater than or equal to the preset threshold value and sequence numbers of the PDUs unsuccessfully received are continuous, the selected status report PDU format comprises the maximum sequence number of PDUs successfully received by the user equipment and further comprises the range of the sequence numbers of the PDUs unsuccessfully received;

when a quantity of the PDUs unsuccessfully received by the user equipment is greater than or equal to a preset threshold value and sequence numbers of the PDUs unsuccessfully received are discontinuous, the selected status report PDU format comprises the maximum sequence number of PDUs successfully received by the user equipment and further comprises the plurality of ranges of the sequence numbers of the PDUs unsuccessfully received, and when a quality of the PDUs unsuccessfully received by the user equipment is less than the present threshold value, the selected status report PDU format comprises the maximum sequence number of PDUs successfully received by the user equipment and further comprises a sequence number of each PDU unsuccessfully received.

8. The network device of claim 7, wherein the range of the sequence numbers comprises a high limit sequence number and a low limit sequence number; and when the maximum sequence number of the PDUs successfully received by the user equipment is adjacent to the high limit sequence number, the status report PDU format comprises the maximum sequence number of the PDUs successfully received by the user equipment and the low limit sequence number.

* * * * *